United States Patent
Zhao et al.

(10) Patent No.: US 10,804,602 B2
(45) Date of Patent: Oct. 13, 2020

(54) 5G MIMO ANTENNA SYSTEM AND HANDHELD DEVICE

(71) Applicant: SHENZHEN SUNWAY COMMUNICATION CO., LTD., Shenzhen, Guangdong (CN)

(72) Inventors: Anping Zhao, Shenzhen (CN); Zhouyou Ren, Shenzhen (CN)

(73) Assignee: SHENZHEN SUNWAY COMMUNICATION CO., LTD., Shenzhen (CN)

( * ) Notice: Subject to any disclaimer, the term of this patent is extended or adjusted under 35 U.S.C. 154(b) by 0 days.

(21) Appl. No.: 16/462,030

(22) PCT Filed: Mar. 4, 2019

(86) PCT No.: PCT/CN2019/076806
§ 371 (c)(1),
(2) Date: May 17, 2019

(87) PCT Pub. No.: WO2020/147172
PCT Pub. Date: Jul. 23, 2020

(65) Prior Publication Data
US 2020/0227820 A1 Jul. 16, 2020

(30) Foreign Application Priority Data
Jan. 14, 2019 (CN) .......................... 2019 1 0030704

(51) Int. Cl.
*H01Q 7/00* (2006.01)
*H01Q 1/38* (2006.01)
(Continued)

(52) U.S. Cl.
CPC .............. *H01Q 1/521* (2013.01); *H01Q 1/243* (2013.01); *H01Q 9/30* (2013.01); *H04B 7/0413* (2013.01)

(58) Field of Classification Search
CPC .......... H01Q 1/521; H01Q 1/243; H01Q 9/30; H01Q 5/10; H01Q 1/38; H01Q 21/06;
(Continued)

(56) References Cited

U.S. PATENT DOCUMENTS

| 6,683,574 B2 * | 1/2004 | Su .......................... H01Q 9/42 |
| | | 343/700 MS |
| 7,973,726 B2 * | 7/2011 | Tseng ..................... H01Q 1/243 |
| | | 343/700 MS |

(Continued)

FOREIGN PATENT DOCUMENTS

| CN | 1669182 A | 9/2005 |
| CN | 1701465 A | 11/2005 |

(Continued)

OTHER PUBLICATIONS

Sep. 27, 2019 Interational Search Report issued in International Patent Application No. PCT/CN2019/076806.

*Primary Examiner* — Pablo N Tran
(74) *Attorney, Agent, or Firm* — Oliff PLC

(57) ABSTRACT

A 5G MIMO antenna system includes at least four antenna units which are arrayed at intervals. Each antenna unit includes a first branch and a second branch, wherein the first branch is of an inverted-U structure, and two ends of an opening of the first branch are grounded; the second branch is located in an area defined by the first branch and is a monopole branch, and a feed point is arranged at an end, close to the opening of the first branch, of the second branch. The first branches and the second branches generate two different resonances, so that the 5G antenna system has a broadband operation. Meanwhile, the 5G MIMO antenna system has the characteristics of being small in size, good in isolation and broad in frequency band.

12 Claims, 5 Drawing Sheets

(51) Int. Cl.
  *H01Q 5/10*    (2015.01)
  *H01Q 21/28*   (2006.01)
  *H01Q 1/52*    (2006.01)
  *H01Q 1/24*    (2006.01)
  *H01Q 9/30*    (2006.01)
  *H04B 7/0413*  (2017.01)

(58) Field of Classification Search
  CPC ...... H01Q 21/28; H01Q 1/523; H01Q 1/2266; H01Q 9/42; H01Q 5/378; H04B 7/0413
  See application file for complete search history.

(56) References Cited

U.S. PATENT DOCUMENTS

| | | | | |
|---|---|---|---|---|
| 8,350,774 | B2* | 1/2013 | Pickles | H01Q 9/16 343/795 |
| 8,531,337 | B2* | 9/2013 | Soler Castany | H01Q 1/242 343/702 |
| 9,153,873 | B2* | 10/2015 | Ng | H01Q 1/521 |
| 10,020,583 | B2* | 7/2018 | Wu | H01Q 9/0421 |
| 10,306,029 | B1* | 5/2019 | Hwang | H01Q 13/10 |
| 10,367,266 | B2* | 7/2019 | Wong | H01Q 21/28 |
| 10,673,124 | B2* | 6/2020 | Lee | H01Q 21/28 |
| 10,680,332 | B1* | 6/2020 | Li | H01Q 5/42 |
| 2008/0258992 | A1* | 10/2008 | Tsai | H01Q 1/2266 343/853 |
| 2010/0052997 | A1* | 3/2010 | Kan | H01Q 1/38 343/702 |
| 2011/0102281 | A1* | 5/2011 | Su | H01Q 1/36 343/742 |
| 2012/0212389 | A1* | 8/2012 | Aizawa | H01Q 1/36 343/853 |
| 2012/0274536 | A1* | 11/2012 | Pan | H01Q 1/38 343/853 |
| 2013/0162496 | A1* | 6/2013 | Wakabayashi | H01Q 21/00 343/853 |
| 2016/0093949 | A1* | 3/2016 | Chang | H01Q 1/526 343/841 |
| 2017/0141465 | A1* | 5/2017 | Sharawi | H01Q 21/28 |
| 2017/0162948 | A1* | 6/2017 | Wong | H01Q 5/10 |
| 2018/0212304 | A1* | 7/2018 | Peng | H01Q 3/24 |
| 2019/0305415 | A1* | 10/2019 | Sharawi | H01Q 21/0075 |
| 2020/0144733 | A1* | 5/2020 | Chakraborty | H01Q 21/245 |
| 2020/0203804 | A1* | 6/2020 | Khripkov | H01Q 5/307 |

FOREIGN PATENT DOCUMENTS

| | | |
|---|---|---|
| CN | 202523837 U | 11/2012 |
| CN | 207677073 U | 7/2018 |
| CN | 108493600 A | 9/2018 |
| EP | 2811573 A1 | 12/2014 |

* cited by examiner

5G MIMO ANTENNA SYSTEM AND HANDHELD DEVICE

TECHNICAL FIELD

The invention relates to the technical field of communications, in particular to a broadband 5G MIMO antenna system and a handheld device.

DESCRIPTION OF RELATED ART

With the rapid development of wireless communication technology, fifth-generation (5G) wireless communication systems will be commercially used in 2020. The 5G wireless communication systems work mainly within the millimeter wave band or below 6 GHz, wherein 5G systems below 6 GHz will be preferential options because of their simple operation and mature technology. In order to meet the requirement for 5G transmission rates, handheld devices have be equipped with about eight MIMO antennas, that is to say, a 8×8 MIMO antenna system will be adopted. Due to space limitations of the handheld devices such as mobile phones, how to design small-sized antennas is one of the main challenges encountered when MIMO antenna systems are designed.

Another challenge for the MIMO antenna systems is how to design broadband antennas which have a broader 5G Sub-6 GHz frequency band. In addition, on the premise of fulfilling a small size and broadband of the MIMO antenna systems, how to realize good isolation (such as better than 15 dB) of the MIMO antenna systems is also a challenge encountered during MIMO antenna design. As for the frequency range involved in sub-6 GHz, 3GPP has recently listed 3.3-4.2 GHz (namely frequency band N77) as one of the important frequency bands of 5G. Different countries can select desired 5G frequency bands from this frequency band under specific conditions. For instance, frequency band 3.4-3.6 GHz is adopted in Korea, frequency band 3.6-4.2 GHz is adopted in Japan, and frequency band 3.4-3.8 GHz is adopted in European Union. Up to now, most of 8×8 MIMO antenna designs in existence can cover only one or two 5G frequency bands.

As an example, Chinese Utility Model Patent (Application No. CN207677073U) discloses a 5G MIMO antenna system and a handheld device. However, this MIMO antenna system only covers the frequency band of 3.4-3.6 GHz. In view of this, it is necessary to design an MIMO antenna system capable of covering the whole frequency band N77 to fulfill 5G roaming in all countries. In addition, the reduction of isolation between antennas is also a challenge to be solved for the MIMO antenna systems. Methods for reducing the isolation between antennas have been widely studied, discussed and implemented, for instance, by adding isolation strips between adjacent antennas, forming slots on system substrates, adopting isolation networks and adding isolating neutralization line between antennas. However, no matter which one of these methods is adopted, the antennas will be more complex and more difficult to design, and meanwhile, the debugging difficulty in the later stage will also be increased.

BRIEF SUMMARY OF THE INVENTION

The technical issue to be solved by the invention is to provide a small-sized, high-isolation and broadband 5G MIMO antenna system for handheld devices.

One technical solution adopted by the invention to solve the above technical issue is as follows:

A 5G MIMO antenna system comprises at least four antenna units which are arrayed at intervals. Each antenna unit comprises a first branch and a second branch, wherein:

the first branch is of an inverted-U structure, and two ends of an opening of the first branch are grounded;

the second branch is located in an area defined by the first branch and is a monopole antenna branch, and a feed point is arranged at an end, close to the opening of the first branch, of the second branch.

Another technical solution adopted by the invention is as follows:

A handheld device comprises the 5G MIMO antenna system mentioned above.

The invention has the following beneficial effects:

The first self-isolated branch of the inverted-U structure has two parts: a ground branch connected to the ground on both sides, and two additional branches symmetrically located inside the ground branch. The first branch generates one resonance of the antenna unit;

the second branch is located in the middle of the whole antenna unit, is provided with the feed point and serves as a feed branch to feed the antenna unit; besides the function of feeding the antenna unit, the second branch is also used to generate one resonance of the antenna unit; and the 5G MIMO antenna system is able to cover the whole frequency band N77 by adjustment of the length of the feeding branch and the size of the self-isolation radiator branch coupled with the feed branch of the antenna unit.

The 5G MIMO antenna system in this solution maintains the advantages of the self-isolation antenna in Chinese Utility Model Patent Application No. CN207677073U, thereby having good isolation; and meanwhile, one resonance generated by the self-isolation radiator branches and another resonance generated by the feeding branches constitute two resonances of the antenna units, and thus, the 5G MIMO antenna system is able to cover the whole frequency band N77.

Figure 1:
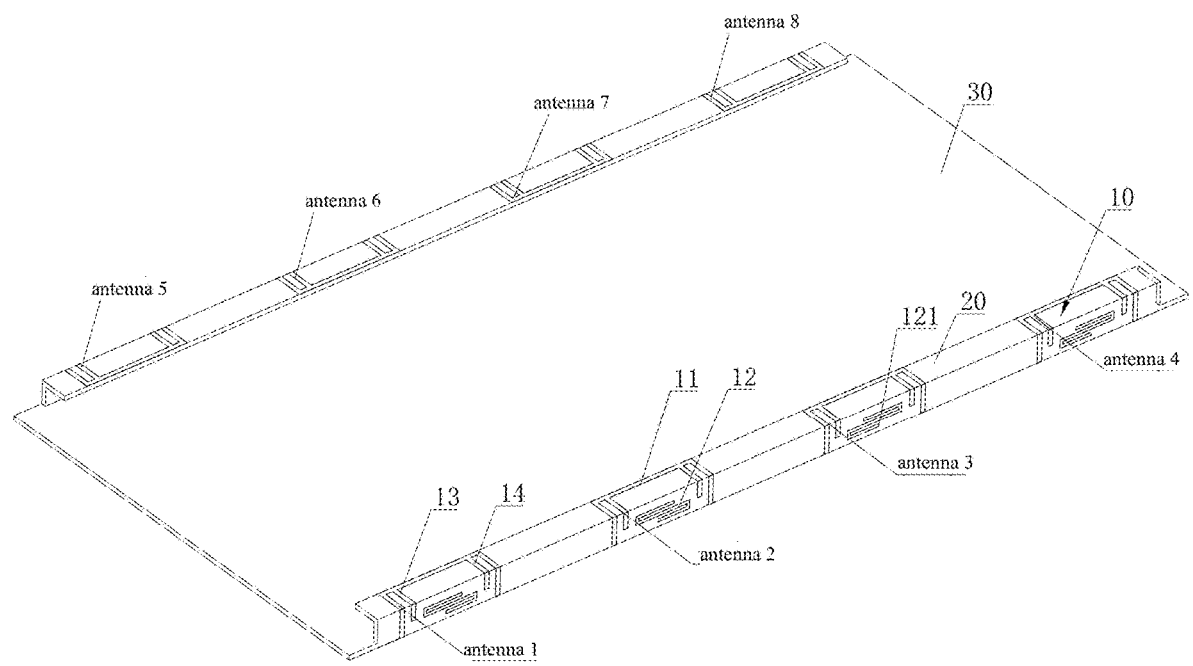
FIG. 1 is an arrangement diagram of a 5G MIMO antenna system in a 5G mobile phone in an embodiment of the invention.

REFERENCE SIGNS 10, antenna unit; 11, first branch; 12, second branch; 121, feed point; 13, third branch; 14, fourth branch; 15, grounding point; 20, antenna frame; 30, substrate.

DETAILED DESCRIPTION OF THE INVENTION

The technical contents, objectives and effects of the invention are detailed below in combination with embodiments and accompanying drawings.

The key conception of the invention is that a self-isolation radiator branch and a feeding branch are designed to obtain good isolation and two resonances are generated to cover the whole frequency band N77.

Referring to FIGS. 1-8, a 5G MIMO antenna system comprises at least four antenna units 10 which are arrayed at intervals. Each antenna unit 10 comprises a first branch 11 and a second branch 12, wherein:

The first branch 11 is of an inverted-U structure, and the first branch 11 is grounded at its two ends.

The second branch 12 is located in an area defined by the first branch 11 and is a monopole antenna branch, and a feed point 1 is arranged at its end, close to the opening branches of the first branch 11, of the second branch 12.

From the above description, the invention has the following beneficial effects: the first branch 11 of the inverted-U structure serves as a self-isolated antenna radiator. This first branch is used to generate one resonance of the antenna unit, this first branch is grounded at its two ends.

The second branch is located in the middle of the whole antenna unit, is provided with the feed point and serves as a feeding branch to feed the antenna unit; besides the function of feeding the antenna unit, the second branch is also used to generate another resonance of the antenna unit; and the 5G MIMO antenna system is able to cover the whole frequency band N77 by adjustment of the length of the feeding branch and the size of the self-isolation radiator branch coupled with the feed branch of the antenna unit.

The 5G MIMO antenna system in this solution maintains the advantages of the self-isolation antenna in Chinese Utility Model Patent Application No. CN207677073U, thereby having good isolation; and meanwhile, one resonance generated by the self-isolation radiator branches and another resonance generated by the feeding branches constitute two resonances of the antenna units, and thus, the 5G MIMO antenna system is able to cover the whole frequency band N77.

Furthermore, the first branch 11 is provided with a third branch 13 and a fourth branch 14 symmetrical with the third branch 13, wherein one end of the third branch 13 and one end of the fourth branch 14 are connected with the top of the first branch 11, the other end of the third branch 13 and the other end of the fourth branch 14 extend towards the opening of the first branch 11, and the second branch 12 is located between the third branch 13 and the fourth branch 14.

From the above description, the third branch 13 and the fourth branch 14 can further decrease the size of the antenna unit.

Furthermore, the 5G MIMO antenna system further comprises at least two antenna frames 20. Each antenna frame 20 contains at least two antenna units 10, and the longitudinal section of each antenna frame 20 is in an inverted-L shape. The first branches 11, the third branches 13 and the fourth branches 14 stretch across top walls and side walls of the antenna frames 20, and the second branches 12 are located on the side walls of the antenna frames 20.

From the above description, the antenna frames 20 are used to support the antenna units, the first branches 11, the third branches 13 and the fourth branches 14 stretch across the top walls and the side walls of the antenna frames 20, the self-isolation radiator branches are located on the top walls of the antenna brackets 20, the grounding branches of each antenna unit are bent along the corresponding antenna frame 20 to be connected with a metal ground to form two grounding points 15, and the third branches 13 and the fourth branches 14 are bent in the same way; and the antenna frames 20 in the inverted-L shape can further decrease the height of the antenna units in the vertical direction of a substrate 30.

Furthermore, the 5G MIMO antenna system further comprises at least two antenna frames 20. Each antenna frame 20 supports at least two antenna units 10 and has a linear longitudinal section perpendicular to a substrate. The first branches 11, the second branches 12, the third branches 13 and the fourth branches 14 are arranged on the side faces of the antenna frames 20.

From the above description, the vertical only antenna frames 20 are also feasible in this solution.

Furthermore, the antenna frames 20 are made from plastic, and the antenna units 10 are FPC antennas.

Furthermore, the antenna frames 20 are made from LDS materials, and the antenna units 10 are LDS antennas.

Furthermore, the two antenna frames 20 are symmetrically arranged on the two sides of a preset substrate 30.

From the above description, 5G MIMO antennas preferably disposed on the left side and the right side of mobile phones, and correspondingly, one antenna frame 20 support at least two antenna units 10 are arranged on either the left side or the right side of the substrate 30.

Furthermore, a notch is formed in the top of the first branch 11, and parts, located on two sides of the notch, of the first branch 11 are symmetrical with each other.

From the above description, the notch can serve as a small gap or slot to fine tune the resonant frequency of the antenna.

Another technical solution adopted by the invention is as follows:

A handheld device comprises the 5G MIMO antenna system mentioned above.

Referring to FIGS. 1-8, in embodiment 1 of the invention:

A 5G MIMO antenna system is provided.

FIG. 1 is an arrangement diagram of a 5G 8×8 MIMO antenna system in a future 5G mobile phone. A PCB serving as a substrate 30 has a size of 150 mm×75 mm×0.8 mm As a 4G LTE communication system (and other antennas such as GPS antennas and WiFi antennas) which has been widely used at present has been disposed at the upper end and the lower end of the mobile phone, the 5G MIMO antenna system which will be co-exist with the 4G LTE communication system is preferably disposed on the left side and the right side of the mobile phone.

In this embodiment, the 5G MIMO antenna system comprises one antenna frame 20 disposed on the left side of the handheld device, one antenna frame 20 disposed on the right side of the handheld device, and antenna units 10 disposed on the antenna frames 20. The longitudinal section of the antenna frames 20 is in an inverted-L shape.

Particularly, as shown in FIG. 1, the 5G MIMO antenna system in this embodiment is totally provided with eight antenna units which are respectively marked as antenna 1, antenna 2, antenna 3, antenna 4, antenna 5, antenna 6, antenna 7 and antenna 8.

The antenna frames 20 are made from plastic or LDS materials. When the antenna frames are made from plastic, FPC antennas are used as antenna radiators. When the antenna frames are made from LDS materials, LDS antennas are used as antenna radiators.

Figure 2:
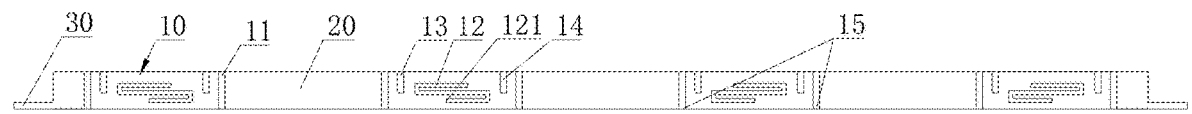
FIG. 2 is a side view of the 5G MIMO antenna system in the embodiment of the invention.
Figure 3:
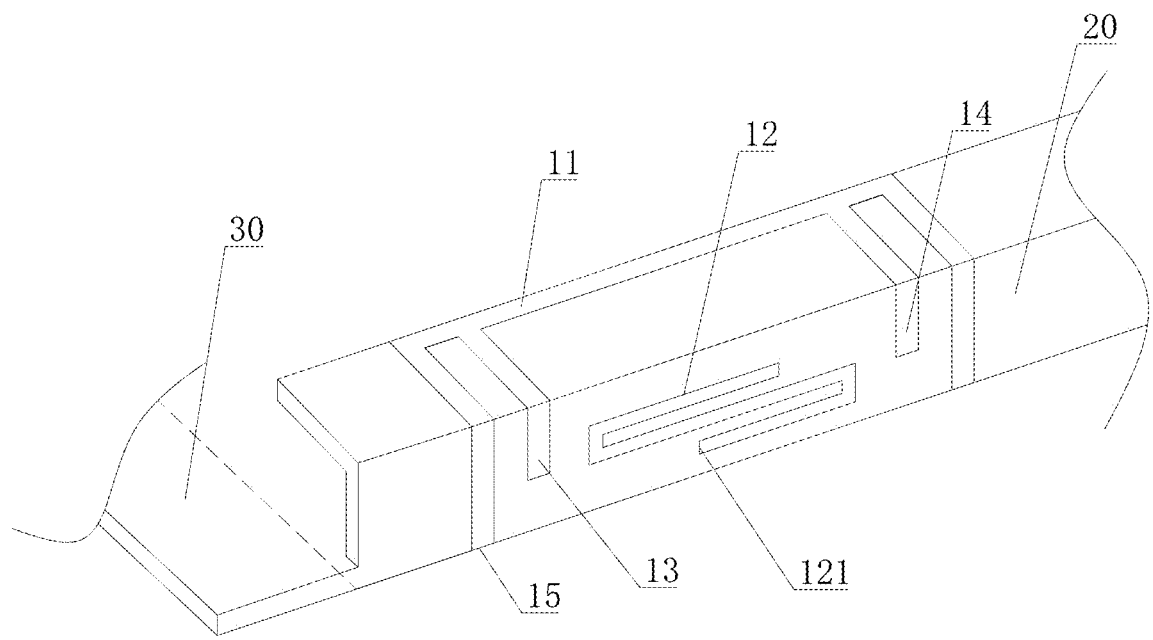
FIG. 3 is a detailed structural view of an antenna unit of the 5G MIMO antenna system in the embodiment of the invention.

As shown in FIG. 2 and FIG. 3, each antenna unit comprises a first branch 11, a second branch 12, a third branch 13 and a fourth branch 14, wherein:

The first branch 11 is of an inverted-U structure, the inverted-U structure serves as a self-isolation radiator branch, grounding branches stretch out from two ends of the self-isolation radiator body and are grounded, and the self-isolation radiator branch and the grounding branches constitute the first branch 11;

the second branch 12 is a monopole antenna branch provided with a feed point 121 and is linear or curved;

one end of the third branch 13 and one end of the fourth branch 14 are connected with the self-isolation radiator branch, the other end of the third branch 13 and the other end of the fourth branch 14 extend towards an opening of the first branch 11, and the third branch 13 and the fourth branch 14 are used as extra branches to further decrease the size of the self-isolation radiator branch;

the first branch 11, the second branch 12, the third branch 13 and the fourth branch 14 are arranged on an outer wall of the corresponding frame 20, wherein the self-isolation radiator branch of the first branch 11 is arranged on a top wall of the antenna frame 20, and the second branch 12 is arranged on a side wall of the antenna frame 20, is located between the third branch 13 and the fourth branch 14 and is used for feeding power to the antenna unit. Besides the function of feeding the antenna unit, the monopole antenna is also used to generate one resonance of the antenna unit.

The antenna frames 20 can have the vertical part only. When the antenna frames 20 are vertical only, the antenna units 10 are arranged on outward sides of the antenna frames 20. Compared with the antenna frames 20 in the inverted-L shape, the vertical only antenna frames 20 require a larger height.

In this specific embodiment, the four antenna units 10 on the left side of the substrate 30 and the four antenna units 10 on the right side of the substrate 30 are respectively arranged on two antenna frames 20, and thus, there are totally two antenna frames; and the antenna frames 20 on each side of the substrate 30 are arrayed in the axial direction of the substrate 30.

The length of the antenna (namely, the distance between the two grounding points 15 on the first branch 11 of the antenna) is represented by L. The 5G MIMO antenna system is able to cover the whole frequency band N77 by adjustment of the length of the feed branch, the size of the self-isolation radiator branch coupled with the feed branch; as well as the position and length of the extra branches of the antenna. Particularly, because the frequency band N77 has a large bandwidth, each antenna unit needs to generate two different resonances. In this solution, the monopole branch used for feeding generates one resonance, and the self-isolation radiator branch generates the other resonance. The 8×8 MIMO antenna system is simulated under the condition of L=18 mm, and the following results are obtained.

Figure 4:
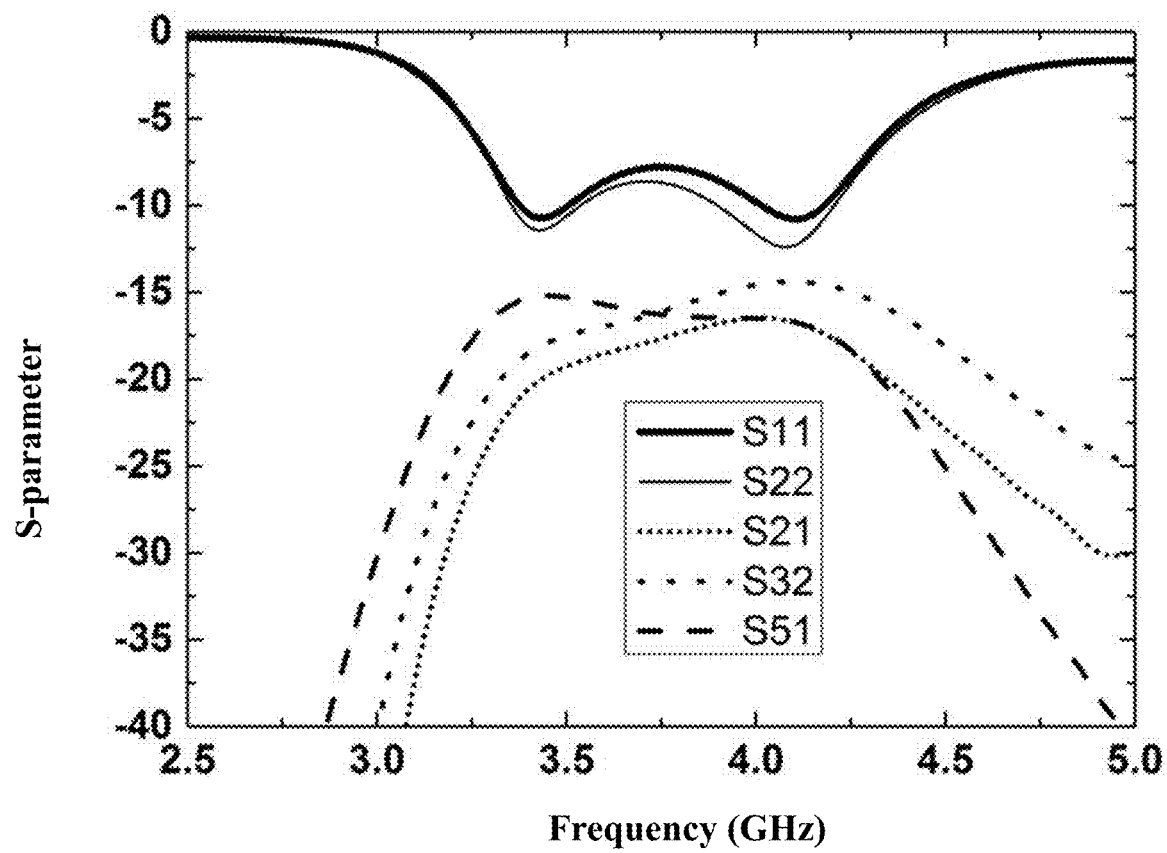
FIG. 4 is an S-parameter diagram of the 5G MIMO antenna system in the embodiment of the invention.

FIG. 4 is an S-parameter diagram of the antenna system. Due to the fact that the MIMO antenna system is bilaterally symmetrical with respect to the PCB, only the simulation results of necessary antenna units are given. As can be seen from curve S11 and curve S22 in FIG. 4, this antenna system has two resonances, wherein one resonance is generated by the self-isolation radiator branches at the resonant frequency of about 3.4 GHz, and the other resonance is generated by the feeding branches at the resonant frequency of about 4.1 GHz. With the two resonances, the antenna system in this solution is able to cover the whole frequency band N77 (3.3-4.2 GHz). Meanwhile, the isolation between the antennas is about 15 dB, which meets design requirements of the MIMO antenna system.

Figure 5:
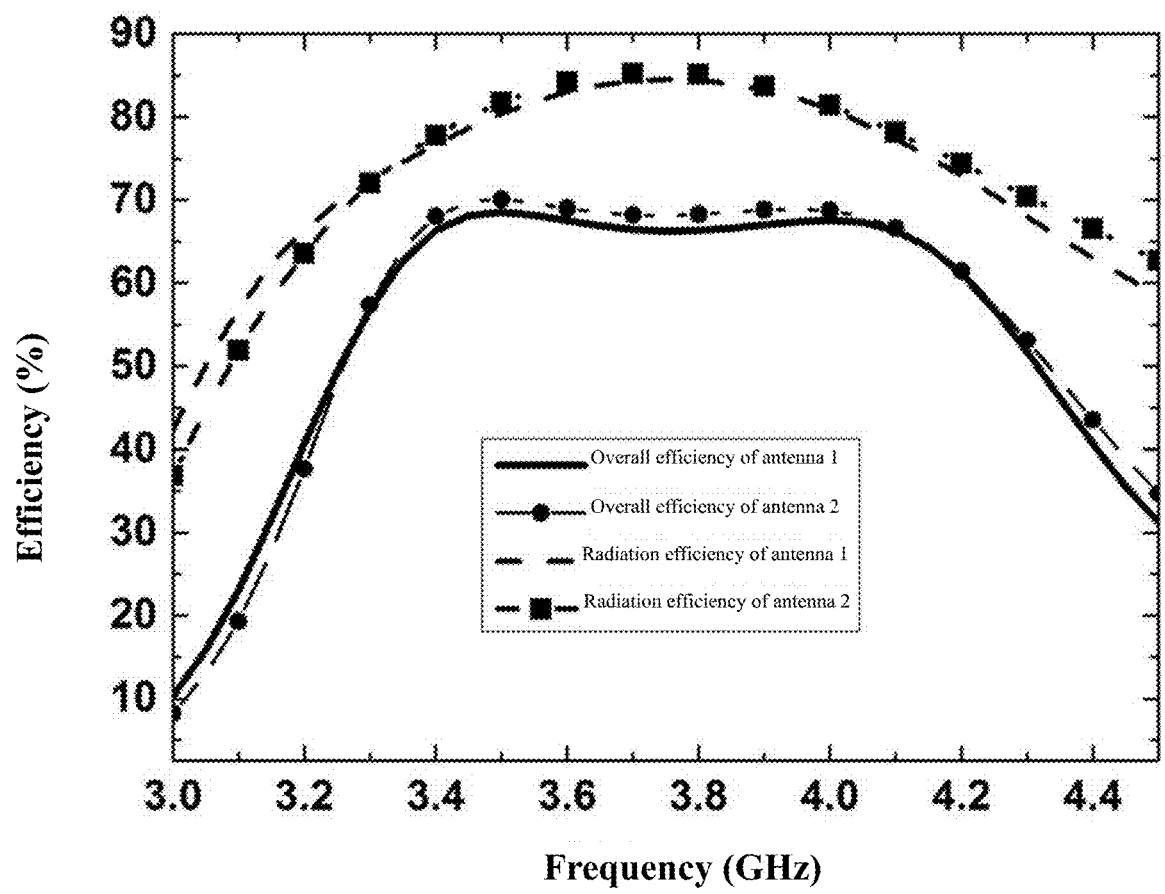
FIG. 5 shows variation curves of the radiation efficiency and antenna total efficiency of the 5G MIMO antenna system vary as a function of frequency in the embodiment of the invention.

FIG. 5 shows variation curves of the radiation efficiency and overall efficiency of the antennas vary as a function of the frequency. As can be seen from FIG. 5, the overall efficiency of the antennas is higher than 56% within the frequency range of 3.3-4.2 GHz.

Figure 6:
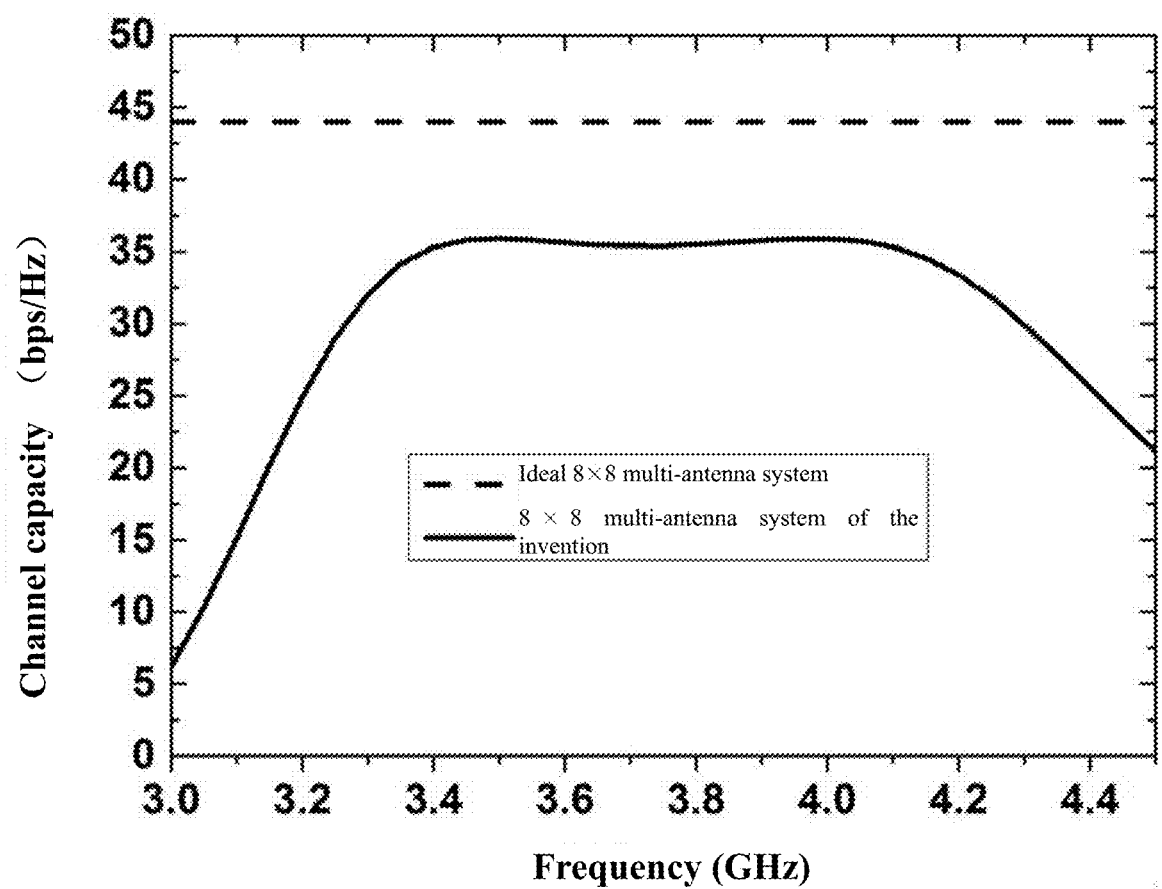
FIG. 6 shows a variation curve of the channel capacity of the 5G MIMO antenna system varies as a function of frequency in the embodiment of the invention.

FIG. 6 shows variation curves of the channel capacity of the 8×8 antenna system vary as a function of the frequency, wherein the dotted line is the variation curve of the channel capacity of an ideal 8×8 MIMO antenna system with a channel capacity of 44 bps/Hz; and within the whole frequency band N77, the actual channel capacity of the antenna system is greater than 32 bps/Hz. The antenna results shown in FIGS. 4, 5 and 6 completely meet the requirements for the 5G 8×8 antenna system below 6 GHz in mobile phone applications.

Figure 7:
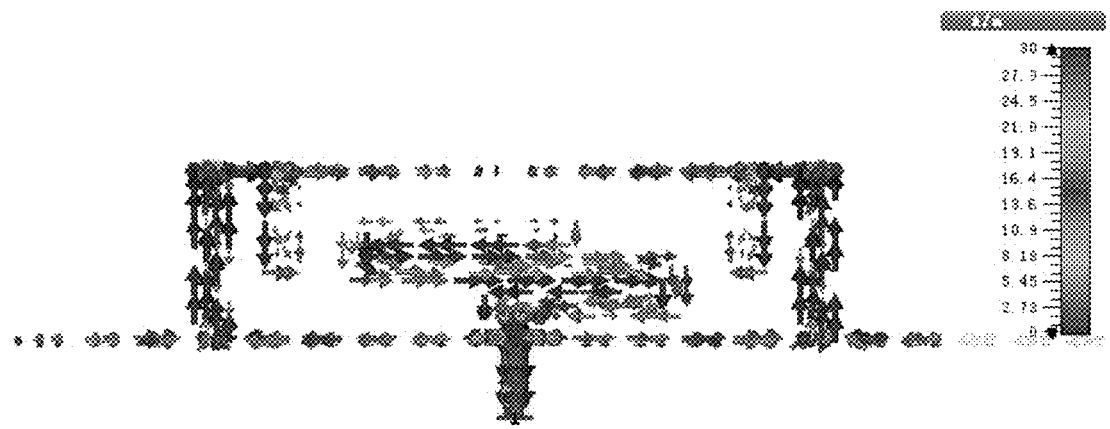
FIG. 7 is a current distribution diagram of one antenna unit of the 5G MIMO antenna system at the resonant frequency of 3.4 GHz in the embodiment of the invention.
Figure 8:
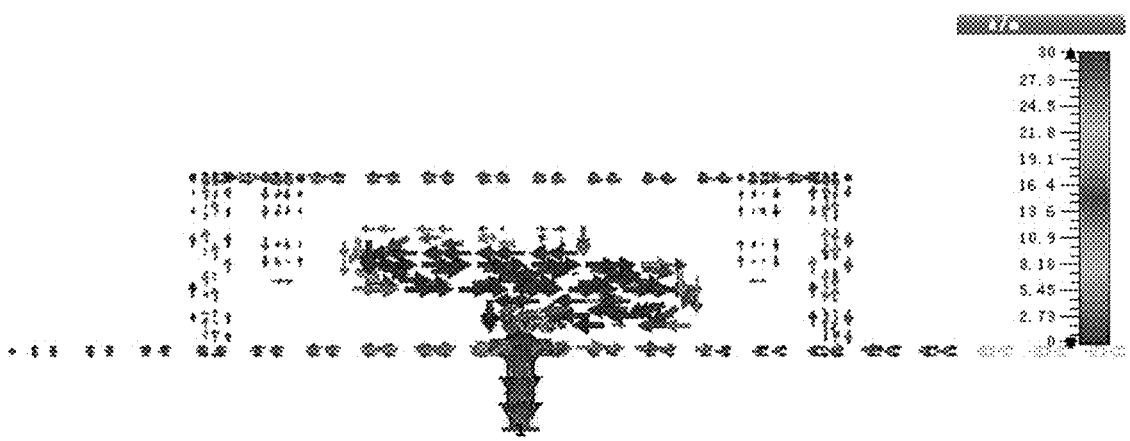
FIG. 8 is a current distribution diagram of one antenna unit of the 5G MIMO antenna system at the resonant frequency of 4.1 GHz in the embodiment of the invention.

For the sake of a better explanation of the working principle of the antenna system, FIG. 7 and FIG. 8 show current distribution diagrams of one antenna unit at two different resonant frequencies. Particularly, FIG. 7 is the current distribution diagram of the antenna unit at the first resonant frequency of 3.4 GHz, and FIG. 8 is the current distribution diagram of the antenna unit at the second resonance frequency of 4.1 GHz. As can be clearly seen from FIG. 8, the current is mostly distributed on the monopole feeding branch of the antenna unit at the resonant frequency of 4.1 GHz, which means that this resonance is generated by the monopole feeding branch of the antenna unit. As the feeding branch is a monopole antenna, the overall length of this antenna branch is about a quarter of the resonant frequency of the antenna branch. As can be seen from FIG. 7, the current is mainly distributed on the self-isolation antenna branch at the resonant frequency of 3.4 GHz, which means that this resonance is generated by the self-isolation radiator branch of the antenna. Due to the fact that the self-isolation radiator branch is fed by the feeding branch, there is still a relatively high current on the feed branch.

As an extension of the antenna design in this solution, a notch is formed in the middle of the self-isolation radiator branch to serve as a small slot to fine tune the resonant frequency of the antenna on the basis that the bilateral symmetry of the antenna is reserved. The monopole feeding branch can be linearly bent (commonly adopted at present) or circuitously bent as long as the overall length of the monopole feed branch of about a quarter of the resonant frequency generated by the monopole feeding branch. In addition, although only the 5G 8×8 MIMO system working below 6 GHz within the frequency band N77 is analyzed and described in this application, the antenna design principle in this application can also be applied to other m×n (in and n are integers greater than two) MIMO antenna systems working within other 5G frequency bands. Meanwhile, any transformations relevant to the antennas described in this application should also fall within the protection scope of this application.

In conclusion, the 5G MIMO antenna system used for the handheld device is small in size and good in isolation. The first branch of the inverted-U structure has two parts, wherein the top antenna part of the U structure serves as a self-isolation radiator branch, grounding branches that are grounded at the two ends, the grounding branches of the of the self-isolation radiator, and the self-isolation radiator branch and the grounding branches constitute the first branch.

The second branch is located in the middle of the whole antenna unit, is provided with the feed point and serves as a feeding branch to feed the antenna unit; besides the function of feeding the antenna unit, the second branch is also used to generate one resonance of the antenna unit; and the 5G MIMO antenna system is able to cover the whole frequency band N77 by adjustment of the length of the feed branch and the size of the self-isolation radiator branch coupled with the feeding branch of the antenna unit.

The 5G MIMO antenna system in this solution maintains the advantages of the self-isolation antenna in Chinese Utility Model Patent Application No. CN207677073U, thereby having good isolation; and meanwhile, one resonance generated by the self-isolation radiator branches and another resonance generated by the feeding branche constitute two resonances of the antenna units, and thus, the 5G MIMO antenna system is able to cover the whole frequency band N77.

The above embodiments are only illustrative ones of the invention and are not intended to limit the patent scope of the invention. All equivalent transformations obtained based on the contents of the specification and drawings, or direct or indirect applications to relevant technical fields should also fall within the patent protection scope of the invention.

The invention claimed is:

1. A 5G MIMO antenna system comprising:
   at least four antenna units which are arrayed at intervals, each antenna unit comprising a first branch and a second branch, wherein
   the first branch is in an inverted-U structure, and two ends of an opening of the first branch are grounded,
   the second branch is located in an area defined by the first branch and is a monopole antenna branch,
   a feed point is arranged at an end, close to the opening of the first branch, of the second branch,
   the first branch is provided with a third branch and a fourth branch, the fourth branch being symmetrical with the third branch, and
   one end of the third branch and one end of the fourth branch are connected with a top of the first branch, another end of the third branch and another end of the fourth branch extend towards the opening of the first branch, and the second branch is located between the third branch and the fourth branch; and
   at least two antenna frames, each antenna frame being provided with at least two of the antenna units, wherein
   a longitudinal section of the antenna frames is in an inverted-L shape, the first branches, the third branches and the fourth branches stretch across top walls and side walls of the antenna frames, and the second branches are located on the side walls of the antenna frames.

2. The 5G MIMO antenna system according to claim 1, wherein the antenna frames are made from plastic, and the antenna units are FPC antennas.

3. The 5G MIMO antenna system according to claim 1, wherein the antenna frames are made from LDS materials, and the antenna units are LDS antennas.

4. The 5G MIMO antenna system according to claim 1, wherein the at least two antenna frames are symmetrically arranged on two sides of a preset substrate.

5. The 5G MIMO antenna system according to claim 1, wherein a notch is formed in a top of the first branch, and parts, located on two sides of the notch, of the first branch are symmetrical with each other.

6. A handheld device, comprising the 5G MIMO antenna system according to claim 1.

7. A 5G MIMO antenna system comprising:
   at least four antenna units which are arrayed at intervals, each antenna unit comprising a first branch and a second branch, wherein
   the first branch is in an inverted-U structure, and two ends of an opening of the first branch are grounded,
   the second branch is located in an area defined by the first branch and is a monopole antenna branch,
   a feed point is arranged at an end, close to the opening of the first branch, of the second branch,
   the first branch is provided with a third branch and a fourth branch, the fourth branch being symmetrical with the third branch, and
   one end of the third branch and one end of the fourth branch are connected with a top of the first branch, another end of the third branch and another end of the fourth branch extend towards the opening of the first branch, and the second branch is located between the third branch and the fourth branch; and
   at least two antenna frames, each antenna frame being provided with at least two of the antenna units, wherein
   a longitudinal section of the antenna frames has only a vertical part, and the first branches, the second branches, the third branches and the fourth branches are arranged on side faces of the antenna frames.

8. The 5G MIMO antenna system according to claim 7, wherein the antenna frames are made from plastic, and the antenna units are FPC antennas.

9. The 5G MIMO antenna system according to claim 7, wherein the antenna frames are made from LDS materials, and the antenna units are LDS antennas.

10. The 5G MIMO antenna system according to claim 7, wherein the at least two antenna frames are symmetrically arranged on two sides of a preset substrate.

11. A handheld device, comprising the 5G MIMO antenna system according to claim 7.

12. The 5G MIMO antenna system according to claim 7, wherein a notch is formed in a top of the first branch, and parts, located on two sides of the notch, of the first branch are symmetrical with each other.

* * * * *